Figure 1:
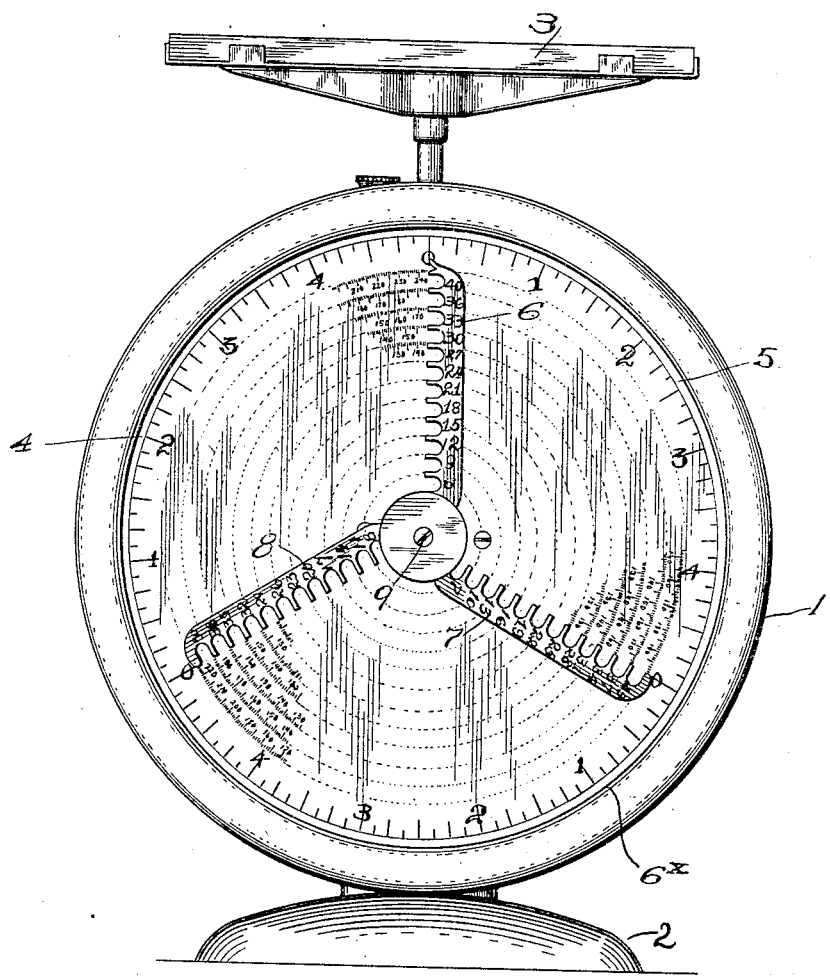

No. 823,679. PATENTED JUNE 19, 1906.
E. N. GILFILLAN.
WEIGHING SCALE.
APPLICATION FILED OCT. 10, 1904.

2 SHEETS—SHEET 1.

Witnesses:
JB Weir
Robert H. Weir

Inventor:
E. N. Gilfillan
by Elliott Hopkins
attys

No. 823,679. PATENTED JUNE 19, 1906.
E. N. GILFILLAN.
WEIGHING SCALE.
APPLICATION FILED OCT. 10, 1904.
2 SHEETS—SHEET 2.
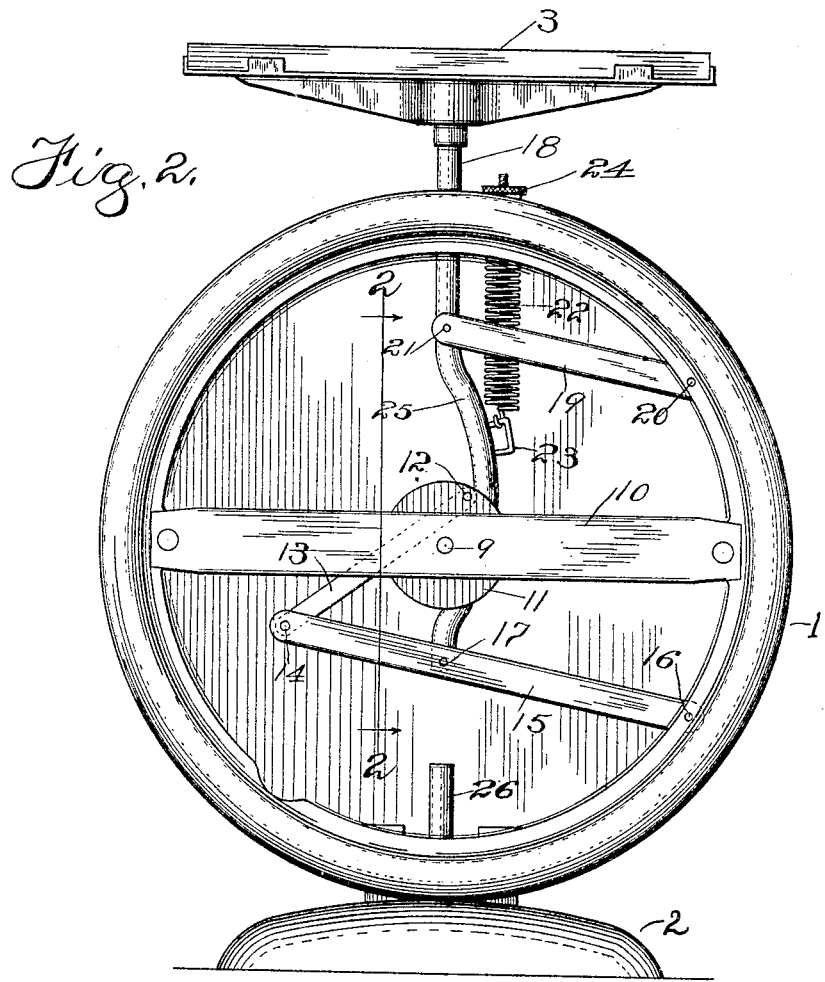
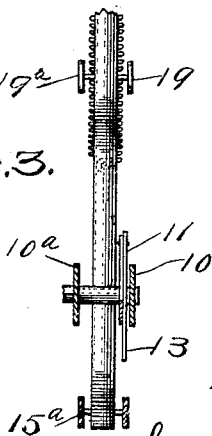
Witnesses
J. B. Weir
Robert H. Weir
Inventor:
E. N. Gilfillan
by Elliott & Hopkins
Attys

UNITED STATES PATENT OFFICE.

ESSINGTON N. GILFILLAN, OF CHICAGO, ILLINOIS, ASSIGNOR TO THE AMERICAN CUTLERY COMPANY, OF CHICAGO, ILLINOIS, A CORPORATION OF ILLINOIS.

WEIGHING-SCALE.

No. 823,679. Specification of Letters Patent. Patented June 19, 1906.

Application filed October 10, 1904. Serial No. 227,820.

*To all whom it may concern:*

Be it known that I, ESSINGTON N. GILFILLAN, a citizen of the United States, residing at Chicago, in the county of Cook and State of Illinois, have invented certain new and useful Improvements in Weighing-Scales, of which the following is a full, clear, and exact specification.

My invention relates to weighing-scales, and more particularly to that class of scales designed for simultaneously indicating the weight and calculating the amount to be charged at a given price per pound.

The invention has for one of its important objects to provide an improved form of weighing-scale of this character in which the number of the different prices may be considerably increased over the number heretofore used on a dial of a given size or area.

A further object of my invention is to provide an efficient scale of simple, inexpensive, and durable construction.

With the described ends in view my invention consists in certain features of novelty, which will be hereinafter described with reference to the accompanying drawings and more particularly pointed out in the claims.

In the said drawings, Figure 1 is a face view of my improved scale, a portion of the matter on the dial being omitted for the sake of brevity. Fig. 2 is a rear elevation thereof with the back removed; and Fig. 3 is a detail cross-section on the line 2 2, Fig. 2.

1 is a body or casing which is preferably 
cylindrical in cross-section, but may be any other form, and is supported by a foot or pedestal 2 and in which is situated the operating mechanism whereby the weight placed upon a suitable pan or platform 3 is indicated.
One end or side of the casing 1 is closed by means of a dial divided radially into three segments 4, 5, and $6^\times$, each of which, as shown by the outer circle of figures, is provided with figures or characters indicating weight ranging from zero up in each segment, and within this outer row of figures are a plurality of concentric rows of figures or characters which indicate money or the product of said weight multiplied by the price.

The various prices are marked or indicated on three index-arms or pointers 6 7 8, which radiate from the center of the dial and are mounted upon the index-arbor 9, so that when the arbor is rotated these arms or pointers will revolve around the dial and traverse their respective segments thereof and when the weight is removed from the pan or platform 3 they will again return to their normal or original positions at zero, as shown in Fig. 1. The prices marked on these arms or pointers, it will be seen, are various, each price being placed opposite the circle containing the numbers or amounts, each of which is a multiple of that price, and the number indicating the weight and which are arranged in a radial column extending between said weight-number and the center of the dial, as well understood in this art, and there being a plurality of the pointers or arms it will be seen that I am enabled to provide a much wider range of prices than heretofore possible with scales of this character.

The arbor 9 is journaled at the back end in a cross-bar 10, which is secured to the casing 1 in any suitable way, and it is provided with a crank, preferably consisting of a disk 11 and crank-pin 12, to which is pivoted one end of the link 13, whose other end is pivoted to an extension 14, constituting a part of an arm 15, which latter is pivoted at 16 to the casing 1. The arm 15 is also pivoted by pin 17 to the lower end of pan-supporting standard 18, and above the arm 15 is arranged a similar arm 19, which is pivoted at one end, as shown at 20, to casing 1 and at the other end, by means of pin 21, to standard 18, and these two arms 15 19 are parallel and serve to maintain the equilibrium of the standard while the latter rises and falls. In order that the support of the standard may be uniform, the arms 15 19 are preferably duplicated on the opposite side thereof, as shown at $15^a$ and $19^a$, respectively, and the arms of each pair thus provided are connected together by the pivot-pins 17 21, which secure them to the standard 18.

The standard 18 is cushioned or yieldingly supported by a suitable spring 22, secured thereto at its lower end by an eye 23 and at its upper end to the casing 1 by the usual adjusting-nut 24, and the standard is preferably arranged directly over the center of the arbor 9 and extends to a point below the arbor; but in order that it may thus pass the arbor it is formed with an offset or bend 25, and when the spring acts to lift the standard to the upper end of its movement it naturally rotates the crank 11 12, and thereby returns the pointer-arms to zero. In order that the opposite movement may be limited, so that the pointer belonging to one segment will not pass the division-line and enter the next segment, a bottom stop 26 is provided for receiving the lower end of the standard 18 as it descends, said bottom stop being planted in any suitable way in casing 1. By this means it will be seen that I am able to provide a scale of simple and durable construction and one which is free from all rack-bars and pinions and other loose joints, which detract from the accuracy of the scale.

Having thus described my invention, what I claim as new therein, and desire to secure by Letters Patent, is—

1. In a scale, the combination of a casing, a pan-supporting standard, parallel arms, one end of said arms being pivoted to the casing and the other end to the standard, one of said arms being provided with an extension, a rotary index-arbor mounted in the casing between the arms and adjacent the standard, a crank carried by the arbor, a link connected to the extension on the arm and engaging the crank, and a spring supporting the standard, said spring being adapted to cause the point of connection of the crank and link to normally stand adjacent the standard.

2. In a scale the combination of a rotary index-arbor, a crank thereon, a pan-supporting standard arranged over said arbor and extending below the same and having an offset where it passes the arbor, means for maintaining the equilibrium of said standard, a spring for supporting said standard and a means connecting said crank with said standard.

E. N. GILFILLAN.

Witnesses:
F. A. HOPKINS,
M. B. ALLSTADT.